(12) United States Patent
Cok et al.

(10) Patent No.: US 7,114,660 B1
(45) Date of Patent: Oct. 3, 2006

(54) NON-IMAGE PIXEL DATA STORED ON HARD-COPY IMAGE MEDIA

(75) Inventors: Ronald S. Cok, Rochester, NY (US); Robert C. Bryant, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 875 days.

(21) Appl. No.: 09/650,198

(22) Filed: Aug. 29, 2000

(51) Int. Cl.
*G06K 19/06* (2006.01)

(52) U.S. Cl. .................................................. 235/494

(58) Field of Classification Search ................ 235/494, 235/380–382, 462.09, 462.11, 487, 468
See application file for complete search history.

(56) References Cited

U.S. PATENT DOCUMENTS

| | | | | |
|---|---|---|---|---|
| 3,755,935 A * | 9/1973 | Annenberg | .................. | 283/94 |
| 4,151,667 A * | 5/1979 | Idelson et al. | ................ | 283/92 |
| 4,213,038 A * | 7/1980 | Silverman et al. | .......... | 235/382 |
| 4,627,819 A | 12/1986 | Burrows | | |
| 4,745,268 A * | 5/1988 | Drexler | ...................... | 235/487 |
| 4,776,013 A * | 10/1988 | Kafri et al. | .................... | 380/54 |
| 4,818,852 A * | 4/1989 | Haddock et al. | ............. | 235/488 |
| 4,972,476 A * | 11/1990 | Nathans | ...................... | 713/186 |
| 5,229,259 A * | 7/1993 | Yokota | ........................ | 430/523 |
| 5,337,361 A * | 8/1994 | Wang et al. | ........... | 235/462.11 |
| 5,490,217 A * | 2/1996 | Wang et al. | ........... | 235/462.09 |
| 5,514,860 A * | 5/1996 | Berson | ........................ | 235/468 |
| 5,542,971 A | 8/1996 | Auslander et al. | | |
| 5,646,388 A * | 7/1997 | D'Entremont et al. | ...... | 235/380 |
| 5,661,506 A * | 8/1997 | Lazzouni et al. | ........... | 345/179 |
| 5,763,891 A * | 6/1998 | Yoshinaga et al. | ....... | 250/459.1 |
| 5,841,885 A * | 11/1998 | Neff et al. | .................. | 382/112 |
| 5,984,366 A * | 11/1999 | Priddy | ....................... | 235/380 |
| 5,995,193 A * | 11/1999 | Stephany et al. | ............. | 355/31 |
| 6,049,627 A * | 4/2000 | Becker et al. | ............. | 382/181 |
| 6,101,039 A * | 8/2000 | Blazey | ....................... | 359/619 |
| 6,104,812 A * | 8/2000 | Koltai et al. | ................ | 283/113 |
| 6,109,526 A * | 8/2000 | Ohanian et al. | ....... | 235/462.45 |
| 6,142,380 A * | 11/2000 | Sansone et al. | ............. | 235/487 |
| 6,174,400 B1 * | 1/2001 | Krutak et al. | .............. | 428/32.6 |
| 6,252,963 B1 * | 6/2001 | Rhoads | ....................... | 380/54 |
| 6,330,976 B1 * | 12/2001 | Dymetman et al. | ......... | 235/487 |
| 6,466,209 B1 * | 10/2002 | Bantum | ...................... | 345/589 |
| 6,556,690 B1 * | 4/2003 | Nelson | ....................... | 235/468 |
| 6,572,025 B1 * | 6/2003 | Nishikado et al. | .......... | 235/494 |
| 6,610,386 B1 * | 8/2003 | Williams et al. | ............ | 283/113 |
| 6,734,887 B1 * | 5/2004 | Field | .......................... | 235/494 |
| 6,808,118 B1 * | 10/2004 | Field | .......................... | 235/494 |

FOREIGN PATENT DOCUMENTS

| | | |
|---|---|---|
| EP | 0 627 720 A1 | 5/1994 |
| JP | 07266755 * | 10/1995 |

OTHER PUBLICATIONS

U.S. Appl. No. 09/537,064, filed Mar. 28, 2000, by Bryant et al.
U.S. Appl. No. 09/128,881, filed Aug. 4, 1998, by Stephany et al.
U.S. Appl. No. 09/223,859, filed Dec. 31, 1998, by Williams et al.
U.S. Appl. No. 09/097,975, filed Jun. 16, 1998, by Bryant et al.

* cited by examiner

*Primary Examiner*—Uyen-Chau N. Le
(74) *Attorney, Agent, or Firm*—Thomas H. Close

(57) ABSTRACT

An image bearing article includes a support; a visible image recorded on the support; invisible information recorded on the support, the invisible information relating to and in registration with elements of the visible image.

42 Claims, 3 Drawing Sheets

NON-IMAGE PIXEL DATA STORED ON HARD-COPY IMAGE MEDIA

FIELD OF THE INVENTION

The present invention relates to image-related pixel information written to or retrieved from hard-copy image media such as color paper or film using an additional light-sensitive layer.

BACKGROUND OF THE INVENTION

Display or capture media for images have been known for over 150 years. Today, these images are often organized into color planes, each plane representing the corresponding color components of the image. Black-and-white images have one plane, while color images generally have three, one each in a color primary, typically red, green, and blue. Images are often stored on negative or positive transparent film, color paper, or digitally on magnetic media. When stored digitally, uncompressed images are generally organized as sets of pixels, image lines, or image planes. Each element of the set represents a different color within the image. When stored on film, a separate physical layer of the film incorporates each color plane of the image. Traditional color silver halide paper uses a similar approach. Inkjet and thermal sublimation techniques deposit separate layers or pixels of primary colored inks.

False-color imaging systems are also well known. In these systems, invisible light (typically infrared or ultraviolet) exposes otherwise traditional imaging materials such as color film to produce a visible color in the exposed medium.

It is often useful to associate non-image information about an image with the image. Such information is often known as meta-data and comprises information such as time of image capture, location of capture, an image description, flash and exposure settings, audio clips, and so forth. This information can be used to optimize the display or use of the image itself. When images are stored digitally, associating such information with an image is straightforward. The meta-data is organized in some structured fashion and written as a header in the image file or otherwise associated with the image file.

Associating such information with images stored on hard-copy media is more problematic. Such a system is described in U.S. Pat. No. 5,763,891 issued Jun. 9, 1998 to Yoshinaga et al., entitled Non-Visualized Information Recording Medium and Apparatus for Detecting the Same.

Techniques are known for writing meta-data on a variety of hard-copy image media. For each of these techniques, invisible, light-responsive materials must be coated or otherwise applied to the medium, and methods to expose or otherwise write information in the invisible material, as well as read the information back, are known (e.g. see U.S. Pat. No. 5,995,193 issued Nov. 30, 1999 to Stephany et al., entitled Self-Contained Device for Recording Data Encoded Either in Visible or Invisible Form). Other materials, such as a thermal sublimation donor material coated with an additional, invisible layer capable of information storage on a receiver media, is known as is the use of an inkjet deposition system to provide an additional invisible layer for information storage on a paper inkjet print. U.S. Pat. No. 5,514,860 issued May 7, 1996 to Berson, entitled Document Authentication System Utilizing a Transparent Label describes placing a transparent tape over a medium. U.S. Pat. No. 5,841,885 issued Nov. 24, 1998 to Neff et al., entitled Print and Method and Apparatus for Printing, Storing and Retrieving an Image Record discloses storing additional digital information on the reverse of an image print.

There are also techniques known that utilize invisible magnetic layers to store information. For example, U.S. Pat. No. 5,229,259 issued Jul. 20, 1993 to Yokota, entitled Silver Halide Photographic Material discloses a silver halide photographic material with a magnetic recording layer. However, these systems and their associated meta-data associate information with the image as a whole and do not physically associate information with each image pixel on the recording medium.

In addition to meta-data describing attributes of an image, information related to each pixel can be useful, particularly if the hard-copy image media constrains the image information. Once written to the constrained medium, original image information is lost. For example, a residual image is the difference between one hard-copy representation of an image (typically color paper) and another less constrained representation (typically color film).

In general, it is possible to store any meta-data or additional information associated with the pixels of an image separately from the image pixels, either on the same hard-copy medium or in a separate location. In the latter case, the meta-data information may become disconnected from the image and lost. In the former case, the storage is inherently less robust in that if a portion of the image is lost or damaged, it is very likely that all of the information will be lost or unrecoverable. Moreover, there is a general problem with digital information storage in file formats. The formats tend to be very media or computer dependent and change rapidly. Hence, information stored in obsolete formats quickly becomes unrecoverable as the software and computer systems to support the format become unavailable.

As images become increasingly pervasive and the variety of image applications grows, additional pixel-related information beyond the traditional red, green, and blue (or cyan, yellow, magenta, and black) is becoming extremely useful. For example, applications such as image scene modeling, image differences, image understanding, multi-image scenes, and three-dimensional images, display require per-pixel information such as scene distance from capture device, pixel differences from other images, color/exposure attributes, or object classification information. This information can be captured or calculated in a variety of ways and readily stored in a digital system but robust storage and recovery of the additional information is problematic when associated with hard-copy film or paper media.

There is a need therefore for an improved method for storing and retrieving additional information associated with each pixel in an image on hard-copy media.

SUMMARY OF THE INVENTION

This need is met according to the present invention by providing an image bearing article that includes a support; a visible image recorded on the support; and invisible information recorded on the support, the invisible information relating to and in registration with elements of the visible image.

Invisible data elements of the invisible layer are designated by "Meta 1, Meta 2, . . . Meta 7".

Figure 2:
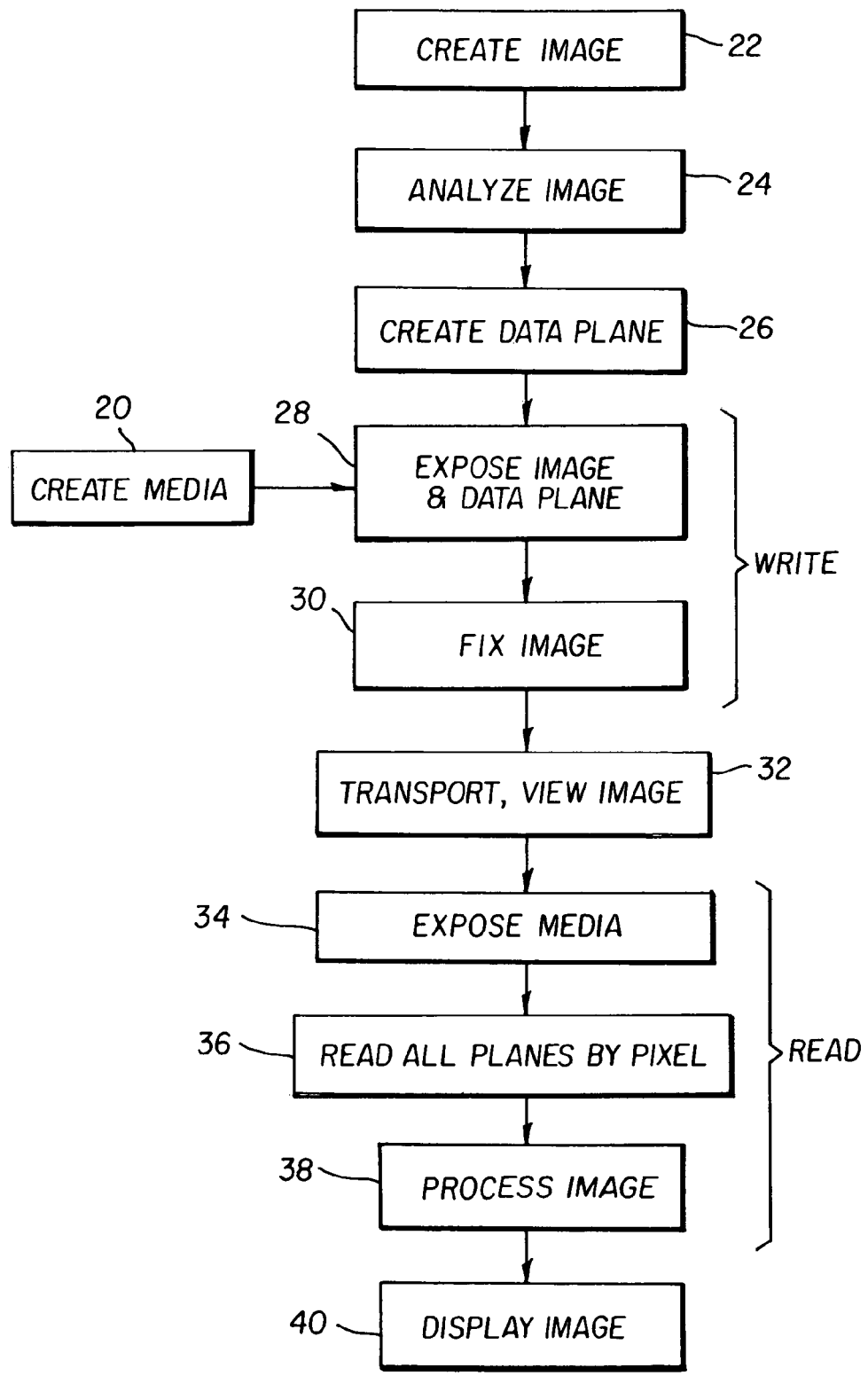

FIG. 2 is a flow chart illustrating the process of digitally recording and reading an image with additional data plane information.

Figure 3:
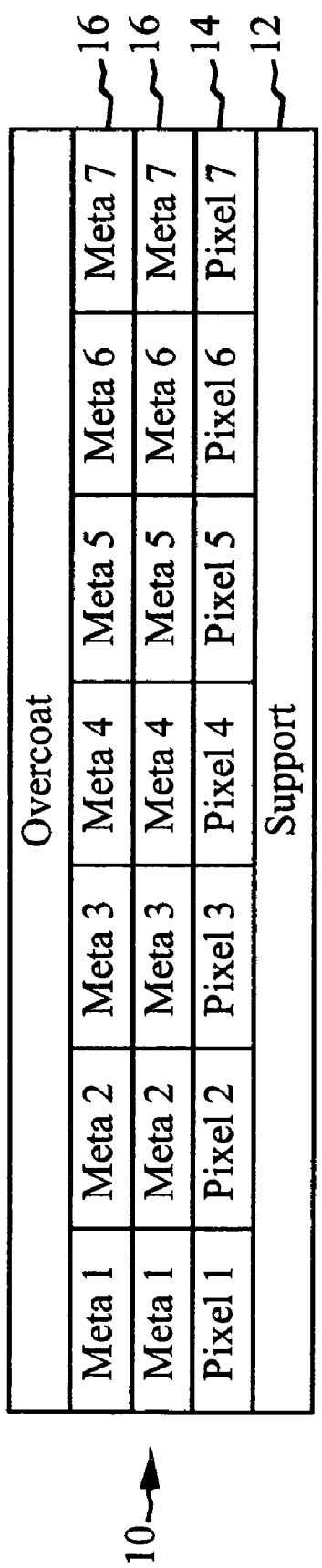

FIG. 3 is a simplified diagram of the present invention showing the organization of the hard-copy materials in another embodiment.

DETAILED DESCRIPTION OF THE INVENTION

The foregoing problems associated with the storage of additional pixel-related information on hard-copy image media, may be overcome by writing and then detecting pixel-related information stored in an invisible layer in the media at each pixel location. This invisible layer is created through conventional coating, sublimation, or deposition means. The information is written by any of various conventional digital means such as optical lasers, heating elements, light-emitting diodes, inkjets, or through the use of traditional optical means. The information must be relevant to the specific pixel at whose location the information is placed and must not be dependent on information stored at other pixel sites. The information is essentially stored in analog form in the medium at each pixel site in a data layer or data plane. Once written, the information in the layer is developed, laminated, or otherwise fixed and made robust in the medium. The information is read back by shining suitable invisible light (infrared or ultraviolet) onto the medium and measuring the light reflected back from the medium at each pixel location. The use of invisible light will not interfere with traditional viewing of the image on the media.

Figure 1:
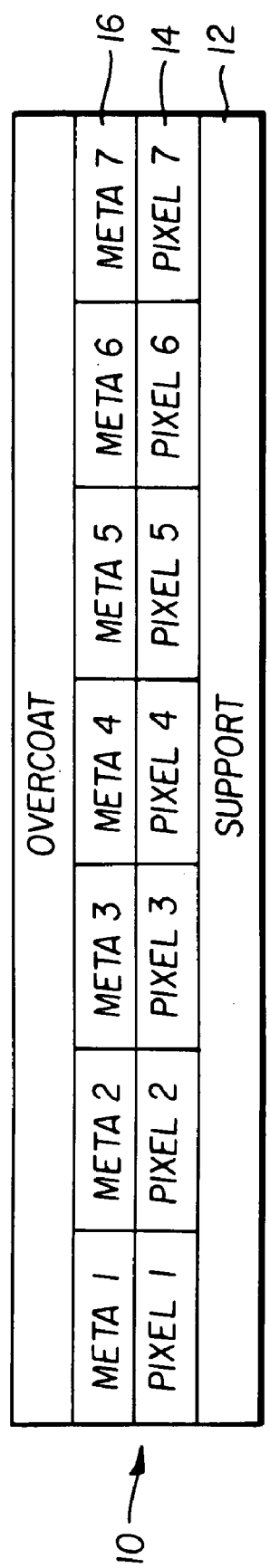
FIG. 1 is a simplified diagram of the present invention showing the organization of the hard-copy materials in a preferred embodiment. Image pixels of the visible image layer are designated by "Pixel 1, Pixel 2, . . . Pixel 7".

The system works as follows (see FIG. 1). A specific imaging medium 10 is provided which includes a support 12, a conventional image layer or layers 14, and an invisible layer 16. A conventional image is formed in layer or layers 14 for example, by writing or depositing the image pixel by pixel. As each image pixel is formed, another corresponding invisible data element is written or deposited in the same physical location as the image pixel. Although the invisible layer 16 is shown over conventional image layer(s) 14, it is also possible to locate the invisible layer 16 under or in between visible image layer(s) 14. If required, after image formation, the medium is developed and fixed, or the image stored in the medium is otherwise made permanent. The medium 10 with the recorded image is then available for use. In some cases, for example with thermal sublimation, entire image color planes and the invisible data plane are written, one plane at a time. In this case, the additional pixel information is written in the same way.

In normal use, the image medium is used as a conventional reflection print or transparency. When a digital version of the image is required, the visible image can be read out using conventional scanning means by illuminating the image and detecting the light reflected from or transmitted through the image. If the invisible data is also required, the scanner illuminates the image with suitable invisible light and detects the light reflected from or transmitted through the invisible layer at each pixel location.

FIG. 2 illustrates the process through a flow chart. In FIG. 2, we see that a suitable media incorporating an additional layer is first created 20 as well as a digital image 22 (whether from a digital camera or other source). The digital image 22 is then analyzed 24 to produce the additional data for each pixel site 26, the image and data layer are written to the media 28, and the image is then fixed 30 in the media if required. The image may be written or exposed a pixel at a time, a line at a time, or a plane at a time, depending on the nature of the writing device. Also, depending on the characteristics of the media, the order in which the image or data planes are written may vary. The media can then be handled, transported, viewed etc. 32, until the additional pixel data is required.

When the additional pixel data is required, the visible image is scanned with visible light to produce a digital image, and the invisible data image is scanned with invisible light 34 and the information recovered 36. Depending on the nature of the invisible dyes or inks, the exposure and reading may be a two-(or more) step process. For example, one might first read the red, then the green, then the blue, then the invisible layers. The image may then be processed using the additional data 38 and the processed image displayed 40.

The image written in step 28 of FIG. 2 need not be in the form of the original image captured. An image might be captured using traditional silver halide photography, and the image can be developed and scanned to produce a digital image. The digital image can be analyzed within a computer, additional information generated in the computer about each pixel in the image, and then the original image re-written together with the additional information on the medium 10. Since the additional pixel information is frequently an abstraction of the image content or otherwise derived from the original image exposure, this approach will be the more likely. For example, additional pixel-related information can also be written to a hard-copy imaging medium that is originally exposed by traditional optical means. Once exposed, a second step of writing the digital information to the medium is performed. It is essential that this step be carefully registered with the original exposure step.

Since the additional pixel-related information is physically stored in the same location on the medium as the pixels themselves and is not dependent on other pixels (as, for example, with run-length encoding), the information can be readily recovered under difficult circumstances. If, for example, a portion of the medium were damaged or destroyed by ripping, tearing, or defacing, the remainder of the information can be readily recovered with the pixels themselves. Moreover, the alignment of the hard-copy image and any readers will not be critical since the data information associated with each pixel is stored at the same physical pixel location.

Each medium on which the additional information layer is constructed may have a different mechanism for storage and retrieval of the information. The general requirements are that the exposure of the information may not interfere with the exposure or formation of the visible color image, that the information image is permanently fixed in the medium, and that the medium can then be illuminated with invisible light and reflect or transmit it in a detectable way that does not interfere with normal image viewing. The response of the invisible dyes or inks comprising the invisible image layer must be invisible as well as the illumination to support normal viewing, since it is difficult to guarantee that illumination with invisible light will not occur under normal image viewing circumstances.

A specific system requirement for the writing mechanism, reading mechanism, and dyes or inks is that they be capable of pixel-level resolution. The information may be written one pixel at a time, for example with a laser flying-spot technique or a movable LED or inkjet head, or written all at once with a light beam modulated on a per-pixel basis. Another requirement is that the additional information written within the additional layer be physically co-located (registered) with the traditional image information so that the data is associated with the relevant image pixel. This requirement is similar to traditional imaging systems in which the various color planes are registered together.

In all these cases, the amount of information stored at each pixel location is dependent on the ability of the recording medium and the reading mechanism to discriminate different amounts of invisible dye or material and is dependent on the amount of dye or material that can be present without affecting the normal viewing of the print. In the simplest case, only the presence or absence of the material may be detected, resulting in a one-data-bit per pixel system.

It is also possible to write and retrieve the invisible pixel-related information at different resolutions from the traditional image pixels. For example, an image might be printed at 600 pixels per inch in two dimensions but the invisible information printed and retrieved at 1200 pixels per inch. Thus, four data values might be associated with each pixel, thereby increasing the quantity and density of information in the print. Alternatively, if the material used for the invisible layers has a lower resolution, the invisible pixel-related data may be scanned at a lower resolution than the image data and associated with groups of pixels rather than individual pixels.

It is also possible to extend the concept of using invisible pixel information to create multiple invisible layers. Just as color images record more information than black-and-white images, multiple invisible layers could record more than one additional data point for each traditional pixel as long as they can be readily discriminated, for example, by frequency of illuminator or response. The technique can also be applied to sequential series of images such as motion pictures.

Various embodiments of the present invention are possible. There are many well-known ultraviolet or infrared dyes and inks with the necessary characteristics. Likewise, stabilizers and dispersants are known for coatings on inkjet, thermal sublimation, or silver halide media. Some preferred embodiments will be described here. In the case of traditional chemical color papers or films, an additional layer of light responsive material is coated onto the medium. The layer may or may not be the top layer, so long as it is capable of responding to the invisible light for both writing and reading and can fix that exposure in the layer. Any of the traditional coupler and dye methods known in the art may be used so long as they do not interfere with the normal imaging process, their development is complementary to the normal imaging process, and they meet the system requirements listed above. Note that false-color imaging techniques known in the art can be utilized for the image exposure step (responding to the invisible light) but not the generation of a false-color image plane. Rather, an invisible image plane must be generated in response to the exposure. This can be accomplished using inks, pigments, or dyes that absorb and/or fluoresce in the infrared or ultraviolet regions of the electromagnetic spectrum using means as exemplified in U.S. Pat. Nos. 5,542,971 and 5,514,860. U.S. Pat. No. 5,542,971 issued Aug. 6, 1996 to Auslander et al., entitled Bar Codes Using Luminescent Invisible Inks discloses bar codes using luminescent invisible inks, and U.S. Pat. No. 5,514,860 to Berson (cited above) discloses transparent materials imprinted with inks visible only in the infrared portion of the electromagnetic spectrum.

A second embodiment can utilize thermal media. Conventional image recording using thermal techniques utilizes a donor whose colored material is deposited on the receiver media when stimulated by heat. Each primary color is deposited using a separate, colored donor in a multi-pass system with a covering material laminated on top in a final pass. This technique is readily extended to include an additional, invisible layer encoding information at each pixel site prior to the final pass.

A third embodiment can utilize inkjet media. Conventional inkjet images are recorded by squirting tiny amounts of ink onto a paper medium at each pixel location. Different colors are obtained by squirting different amounts of colored inks, typically cyan, magenta, yellow, and black. Again, this technique is readily extended by squirting an appropriate amount of invisible dye at each pixel location and on top of the existing inks.

Although these systems can be both analog and digital, for many practical applications the invisible light exposure must be done separately from the conventional image information and this is done most easily with digital imaging systems that provide a greater degree of control over the information content and the image data itself. Digital to analog converters are needed to appropriately control the exposure of the medium. As with any hard copy image medium, the actual record will be an analog quantity, typically the amount of dye present.

Once the medium is properly exposed or written and both the visible and invisible image plane data is fixed in the medium, it can be read back and the information applied within the context of the desired imaging system. As with the exposure system, this is most easily accomplished within a digital system. Each pixel can be exposed sequentially or in parallel and the reflected (or transmitted, in the case of film) light measured at the various frequencies of interest. These are, of course, the traditional color planes plus the invisible data plane with the additional information. Traditional scanning techniques known in the art are suitable with the addition of the invisible light. For example, lasers and LED devices can illuminate the medium with an additional frequency while CCDs could respond to the reflected or transmitted invisible light by utilizing an additional light gathering element with a suitable filter. Note that, as with traditional red, green, or blue pixel information, the additional information stored at each pixel location will not be sensitive to minor differences in value when read back, since the actual information is, at this point, analog.

The additional data plane information stored at each pixel location can be used in a variety of applications. For example, additional means might be employed when an image is captured to record the distance to each pixel in the scene from the point of capture. This information is associated with each pixel and can be written onto the image as disclosed in this invention. In a second example, an image might be recorded onto a medium incapable of storing all of the image information (for example, a restricted dynamic range or color gamut). The additional pixel information might represent the difference between the recorded image and the original image. In a third example, an image might be analyzed and each pixel associated with an object in the image or otherwise classified such as foreground and background, flash highlighted, in gamut or out of gamut colors, original or later added special effect, etc. This object classification information might then be stored as additional information at each pixel site. (In this case it is important that the data values be readily differentiable without error since small changes in value may have a major impact on the classification.) In a fourth example, the additional data might represent additional interpolated pixel values. In a fifth example, two images (for example, a stereo pair) might be stored together by recording one image conventionally and the difference between the recorded and the second image stored as additional information at each pixel site. In a still further example, the image is a constrained image, and the data image is the difference between the constrained and an unconstrained version of the image. The constrained image can be constrained for example in resolution, dynamic range, or color gamut.

In general, the invisible data values associated with each pixel must encode some pertinent information. The meaning of the data value should not be susceptible to small changes in the value or pixel location. If this requirement is accommodated, many different kinds of information may be encoded as described above. In other cases, interpolated pixel values might be encoded or information relating to the calibration or absolute range of the associated pixel values.

An image recording medium with the addition of an invisible layer to record additional image information at each pixel, together with means for writing and reading back the invisible information provide a simple and robust mechanism for recording non-traditional image information on image hard copy. The invention utilizes conventional media, digital writing, and digital reading techniques.

The invention has been described in detail with particular reference to certain preferred embodiments thereof, but it will be understood that variations and modifications can be effected within the spirit and scope of the invention.

PARTS LIST 10 imaging medium
12 support
14 image layer
16 invisible layer
20 create first layer step
22 create digital image step
24 analyze step
26 produce additional data step
28 write to media
30 fix image step
32 handle, transport or view step
34 scan step
36 recover information step
38 process additional data step
40 display image step

What is claimed is:

1. An image bearing article, comprising:
   a) a support;
   b) at least one visible image layer recorded on the support, the visible image layer having a plurality of image pixels having image information; and
   c) an invisible layer recorded on the support, the invisible layer being over or under said visible image layer, the invisible layer having invisible data elements corresponding to each of said image pixels of said visible image layer, each of said invisible data elements being in registration with a respective one of the image pixels of the visible image layer, each of said invisible data elements having one of a plurality of values encoding additional information about the respective one of the image pixels of the visible image layer, each of said invisible data elements being individually readable to provide said additional information.

2. The article claimed in claim 1, wherein the invisible data elements are each distance information relating to a respective one of the image pixels.

3. The article claimed in claim 1, wherein the invisible data elements are each a classification of a respective one of the image pixels.

4. The article claimed in claim 1, wherein the invisible data elements are each a difference between a respective one of the image pixels and a corresponding element in a separate image.

5. The article claimed in claim 4, wherein the visible image layer and the separate image comprise a stereo pair.

6. The article claimed in claim 1, wherein the invisible data elements are each an attribute of the color or exposure of a respective one of the image pixels.

7. The article claimed in claim 1, wherein the visible image layer is a constrained image and the invisible data elements each represent a difference at a respective one of the image pixels between the constrained image and an unconstrained version of the image.

8. The article claimed in claim 7, wherein the visible image layer is constrained in resolution.

9. The article claimed in claim 7, wherein the visible image layer is constrained in dynamic range.

10. The article claimed in claim 7, wherein the visible image layer is constrained in color gamut.

11. The article claimed in claim 1, wherein the invisible layer is detectable in the ultraviolet region of the electromagnetic spectrum.

12. The article claimed in claim 1, wherein the invisible layer is detectable in the infrared region of the electromagnetic spectrum.

13. The image bearing article claimed in claim 1, wherein the invisible layer is one of multiple layers of invisible information on the support.

14. The image bearing article claimed in claim 1, wherein the article contains a temporal sequence of images.

15. An image bearing article, comprising:
    a) a support;
    b) at least one visible image layer recorded on the support, the visible image layer having a plurality of image pixels having image information; and
    c) a plurality of invisible layers recorded on the support, the invisible layers each being over or under said visible image layer, the invisible layers each having invisible data elements corresponding to each of said image pixels of said visible image layer, each of said invisible data elements being in the same physical pixel location as a respective one of the image pixels of the visible image layer, each of said invisible data elements having additional information about the respective one of the image pixels of the visible image layer, wherein respective invisible data elements of each of the invisible layers have different information.

16. The article claimed in claim 15, wherein one of the invisible layers is recorded as a pattern of invisible ink deposited by an inkjet printer.

17. The article claimed in claim 15, wherein one of the invisible layers is recorded as a pattern of invisible dye in a photographic emulsion layer.

18. The article claimed in claim 15, wherein one of the invisible layers is recorded as a pattern of invisible dye deposited by sublimation from a donor.

19. The article claimed in claim 15, wherein the visible image layer is a photographic image.

20. The article claimed in claim 15, wherein the visible image layer is a computer generated image.

21. The image bearing article claimed in claim 2, wherein one of the invisible layers is recorded at a resolution different from that of the visible information.

22. A method of recording an image, comprising the steps of:
   a) recording at least one visible image layer on a medium, the visible image layer having a plurality of image pixels having image information; and
   b) recording an invisible layer on the medium over or under said visible image layer, the invisible layer having invisible data elements corresponding to each of said image pixels of said visible image layer, each of said invisible data elements being in registration with a respective one of the image pixels of the visible image layer, each of said invisible data elements having one of a plurality of values encoding additional information about the respective one of the image pixels of the visible image layer, each of said invisible data elements being individually readable to provide said additional information.

23. The method claimed in claim 22, wherein the invisible data elements are each distance information relating to a respective one of the image pixels.

24. The method claimed in claim 22, wherein the invisible data elements are each a classification of a respective one of the image pixels.

25. The method claimed in claim 22, wherein the invisible data elements are a difference between a respective one of the image pixels and a corresponding element in a separate image.

26. The method claimed in claim 25, wherein the visible image layer and the separate image comprise a stereo pair.

27. The method claimed in claim 22, wherein the invisible data elements are each an attribute of the color or exposure of a respective one of the image pixels.

28. The method claimed in claim 22, wherein the visible image layer is a constrained image and the invisible data elements each represent a difference at a respective one of the image pixels between the constrained image and an unconstrained version of the image.

29. The method claimed in claim 28, wherein the visible image layer is constrained in resolution.

30. The method claimed in claim 28, wherein the visible image layer is constrained in dynamic range.

31. The method claimed in claim 28, wherein the visible image layer is constrained in color gamut.

32. The method claimed in claim 22, wherein the invisible layer is detectable in the ultraviolet region of the electromagnetic spectrum.

33. The method claimed in claim 22, wherein the invisible layer is detectable in the infrared region of the electromagnetic spectrum.

34. The method bearing article claimed in claim 22, wherein the invisible layer is one of multiple layers of invisible information on the medium.

35. The method bearing article claimed in claim 22, wherein the article contains a temporal sequence of images.

36. A method of recording an image, comprising the steps of:
   a) recording at least one visible image layer on a medium, the visible image layer having a plurality of image pixels having image information; and
   b) recording a plurality of invisible layers on the medium wherein the invisible layers are each over or under said visible image layer, the invisible layers each having a plurality of invisible data elements corresponding to each of said image pixels of said visible image layer, each of said invisible data elements being in the same physical pixel location as a respective one of the image pixels of the visible image layer, each of said invisible data elements having additional information about the respective one of the image pixels of the visible image layer, wherein respective invisible data elements of each of the invisible layers have different information.

37. The method claimed in claim 36, wherein one of the invisible layers is recorded as a pattern of invisible ink deposited by an inkjet printer.

38. The method claimed in claim 36, wherein one of the invisible layers is recorded as a pattern of invisible dye in a photographic emulsion layer.

39. The method claimed in claim 36, wherein one of the invisible layers is recorded as a pattern of invisible dye deposited by sublimation from a donor.

40. The method claimed in claim 36, wherein the visible image layer is a photographic image.

41. The method claimed in claim 36, wherein the visible image layer is a computer generated image.

42. The method bearing article claimed in claim 36, wherein one of the invisible layers is recorded at a resolution different from that of the visible image layer.

* * * * *